United States Patent [19]

Tsujisawa

[11] Patent Number: 4,982,297
[45] Date of Patent: Jan. 1, 1991

[54] HEAD POSITIONING SYSTEM FOR COMPENSATING FOR ERRONEOUS DETECTION OF RECORDED POSITION ERROR INFORMATION

[75] Inventor: Takahiko Tsujisawa, Tokyo, Japan

[73] Assignee: NEC Corporation, Tokyo, Japan

[21] Appl. No.: 217,491

[22] Filed: Jul. 11, 1988

[30] Foreign Application Priority Data

Jul. 9, 1987 [JP] Japan ................... 62-172487

[51] Int. Cl.$^5$ .................. G11B 5/596; G11B 21/10
[52] U.S. Cl. ................... 360/77.040; 360/77.080; 369/44.340
[58] Field of Search .............. 360/77.01, 77.02–77.11, 360/78.04, 77.12–77.16; 369/43, 44, 32, 33, 41, 44.32–44.34

[56] References Cited

U.S. PATENT DOCUMENTS

| | | | |
|---|---|---|---|
| 4,135,217 | 1/1979 | Jacques et al. | 360/77.04 |
| 4,616,276 | 10/1986 | Workman | 360/77.04 |
| 4,628,379 | 12/1986 | Andrews, Jr. et al. | 360/77.05 |
| 4,764,914 | 8/1988 | Estes et al. | 360/77.04 |

Primary Examiner—Aristotelis M. Psitos
Assistant Examiner—Steven R. Garland
Attorney, Agent, or Firm—Sughrue, Mion, Zinn, Macpeak & Seas

[57] ABSTRACT

A head positioning system includes a calculating circuit for outputting a signal $u_k$ corresponding to an equilibrium of a step motor for driving a head on the basis of a position error of the head detected at each sampling time. The calculating circuit includes a first calculator for calculating a temporary equilibrium $u''_k$ on the basis of a position error, a memory for storing $u_{k-1}$ to $u_{k-N}$ at respective sampling times, a predictor for calculating a predicted value $u'_k$ and an average value $u'''_k$ in accordance with outputs from the first calculator and the memory, a comparator for comparing $u'_k$ with $u''_k$ to check if they satisfy certain conditions, outputting $u''_k$ as $u_k$ to a step motor driver when the conditions are satisfied, and outputting $u'''_k$ as $u_k$ to the step motor driver when the conditions are not satisfied, and a second calculator, activated by the comparator when the conditions are not satisfied, for calculating back the position error using the output $u_k$ from the comparator so that the first calculator recalculates $u''_k$.

7 Claims, 4 Drawing Sheets

HEAD POSITIONING SYSTEM FOR COMPENSATING FOR ERRONEOUS DETECTION OF RECORDED POSITION ERROR INFORMATION

BACKGROUND OF THE INVENTION

The present invention relates to a head positioning system having position error compensation and, more particularly, to compensation for erroneous detection of a position error detector in positioning of a disk apparatus such as a floppy disk drive (FDD).

It is well known that, in an FDD which uses a floppy disk as a recording medium and a magnetic head as a head, a step motor is used as an actuator for positioning the magnetic head because a servo mechanism can be simplified and in terms of advantages in the size of an apparatus and the cost.

Recently, as such an FDD apparatus is made compact and its capacity is increased, a pitch of data tracks (tracks per inch) of a magnetic disk is reduced, and therefore eccentricity of the data track cannot be ignored. For this reason, positioning accuracy is improved by controlling the step motor not by an open loop but in a feedback manner using a sector servo system.

In the sector servo system, as is well known, the data surface of a magnetic disk is divided into several sectors, and track position error information is written in a start position or an end position of the sector, thereby obtaining track position error information at each sampling time determined by the number of sectors and the rotational frequency of the disk. Then, the magnetic head is feedback-controlled on the basis of the information obtained at the sampling point. U.S. patent application No. 921514 (now U.S. Pat. No. 4,788,608) filed on Oct. 22, 1986 (European Patent Application No. 86114617.3) discloses a method of performing the sector servo system. That is, in this method, a digital filter for generating a sine wave having the same frequency as that of a second frequency component in a variation component in a target data track with respect to an impulse input is provided in a feedback loop, thereby positioning the magnetic head at a position of the target data track with high accuracy.

However, in this method, tracking control of the magnetic head with respect to a data track is performed on the basis of position error information obtained at only each sampling time determined in accordance with the number of sectors and the rotational frequency of the disk. Therefore, if the position error signal itself does not represent a correct value due to noise or defects in the medium, the tracking characteristic of the magnetic head with respect to a data track is degraded when the magnetic head is positioned in accordance with the position error signal.

SUMMARY OF THE INVENTION

It is, therefore, a principal object of the present invention to provide a head positioning system which compensates for erroneous detection of a position error signal, thereby eliminating the above conventional drawback.

A head positioning system having position error compensation according to the present invention, comprises a head for reading servo information recorded in a rotary recording medium at each sampling time and outputting the readout information as a servo information signal, position error detecting means for detecting a position error between a target position to be followed by the head and a current position of the head at each sampling time, a drive mechanism for driving the head, to a position corresponding to an equilibrium head drive controls signal so that the head follows the target position, calculating means for calculating a potential equilibrium or drive control signal on the basis of the position error, memory means for storing the equilibrium or head drive control signals at each sampling time, equilibrium or drive control predicting means for generating an equilibrium predicted value (or predicted drive control signal) using an equilibrium or head drive control signal at a previous sampling time, and first output means for comparing the equilibrium predicted value with an output from the equilibrium calculating means on the basis of a first predetermined value at the next sampling time, and outputting a weighted average drive control signal or the output from the calculating means as an equilibrium or head drive control signal in accordance with a comparison result.

DETAILED DESCRIPTION OF THE PREFERRED EMBODIMENTS

Embodiments of the present invention will be described below with reference to the accompanying drawings. In the following description, signal names and signal values are denoted by the same symbols.

Figure 1:
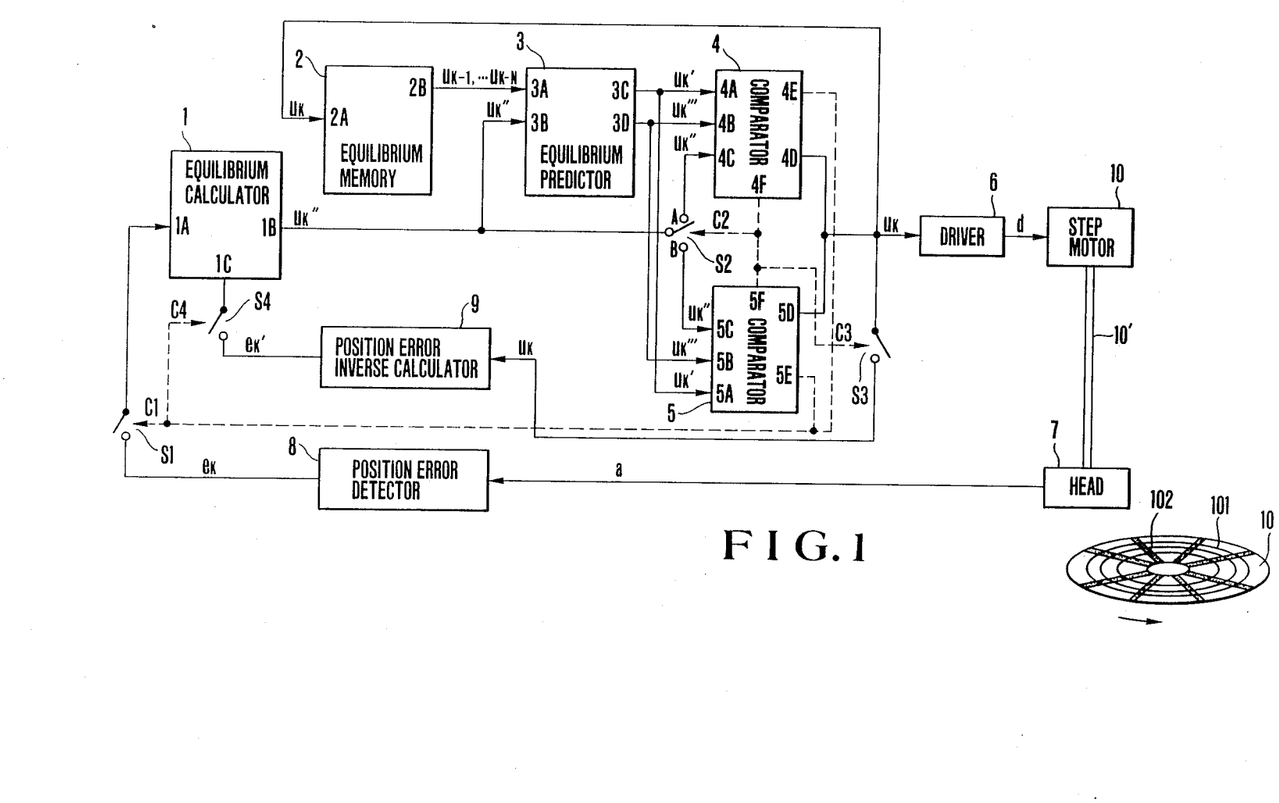
FIG. 1 is a block diagram showing an arrangement of an embodiment of the present invention.

FIG. 1 is a block diagram showing an arrangement of a head positioning system according to an embodiment of the present invention.

In FIG. 1, dotted lines represent transmission paths of a switch control signal.

In FIG. 1, a magnetic head 7 is arranged above a magnetic disk 100 which is rotated in an arrow direction. The magnetic head 7 reads servo information 102 recorded in each sector of the magnetic disk 100 at each sampling time determined in accordance with the number of sectors and the rotational frequency of the magnetic disk 100 and supplies the information as servo information a to a position error detector 8.

The magnetic head 7 is moved in the radial direction of the magnetic disk 100 by a step motor 10 which is driven by a drive signal d supplied from a driver 6. The magnetic head 7 is positioned in correspondence to a stop position of the step motor 10, i.e., an equilibrium point. Therefore, a drive control signal $u_k$ (to be referred to as an equilibrium hereinafter) required for moving the step motor 10 to the equilibrium point must be supplied to the driver 6.

At a sampling time k, the position error detector 8 detects a position error of the magnetic head 7 on the basis of the servo information signal a output from the magnetic head 7 and outputs a position error signal $e_k$ to an equilibrium or drive control calculator 1.

An output terminal of the position error detector 8 is connected to an input terminal 1A of the equilibrium calculator 1 through a switch S1. The switch S1 is controlled in accordance with a control signal C1 and closed at each sampling time of the, magnetic head 7.

The equilibrium or drive control calculator 1 calculates an equilibrium or drive control signal $u''_k$ as a candidate on the basis of the position error signal $e_k$.

An output terminal 1B of the equilibrium calculator 1 is connected to an input terminal 3B of an equilibrium or drive control predictor 3 and the center terminal of a switch S2 which is controlled by a control signal C2. An input terminal 1C of the equilibrium calculator 1 is connected to one terminal of a switch S4 which is controlled by a control signal C4. The other terminal of the switch S4 is connected to the output terminal of a position error inverse calculator 9 to be described later.

An equilibrium or drive control memory 2 stores actual equilibriums or drive control signal $u_{k-1}$, $u_{k-2}$, and so on at the respective sampling times.

An input terminal 2A of the equilibrium memory 2 is connected to the input terminal of the driver 6 and receives the equilibrium or head drive control signal $u_k$, and its output terminal 2B is connected to an input terminal 3A of the equilibrium predictor 3. The equilibrium predictor 3 calculates a predicted value $u'_k$ of an equilibrium or drive control signal and a weighted average value $u'''_k$ of past equilibriums or drive control signals on the basis of the input terminals 3A and 3B and outputs the values from output terminals 3C and 3D, respectively.

The output terminal 3C of the equilibrium predictor 3 is connected to input terminals 4A and 5A respectively of comparators 4 and 5. The output terminal 3D of the equilibrium predictor 3 is connected to input terminals 4B and 5B respectively of the comparators 4 and 5.

Input terminals 4C and 5C of the comparators 4 and 5 are connected to contacts A and B of the switch S2, respectively.

When the center terminal of the switch S2 is connected to the contact A, the comparator 4 compares the output $u'_k$ from the equilibrium predictor 3 with the output $u''_k$ from the equilibrium calculator 1 using a predetermined value $\alpha$ on the basis of equation (1):

$$u'_k - \alpha \leq u''_k \leq u'_k + \alpha \qquad (1)$$

As a result, if the output $u''_k$ satisfies equation (1), the comparator 4 outputs the input signal $u''_k$ to the input terminal 4C from the output terminal 4D as the actual equilibrium $u_k$.

If equation (1) is not satisfied, the comparator 4 outputs the weighted average value $u'''_k$ input to the input terminal 4B from the output terminal 4D as the equilibrium $u_k$ and outputs the control signals C2 and C3 from control signal output terminals 4E and 4F, respectively.

When the switch S2 is connected to the contact B, the comparator 5 compares the input signal $u'_k$ to the input terminal 5A and the input signal $u''_k$ to the input terminal 5C using a predetermined value $\beta$ on the basis of equation (2):

$$u'_k - \beta \leq u''_k \leq u'_k + \beta \qquad (2)$$

As a result, if the signal $u''_k$ satisfies equation (2), the comparator 5 outputs the signal $u''hd\ k$ as the actual equilibrium $u_k$ from the output terminal 5D.

If equation (2) is not satisfied, the comparator 5 outputs the input signal $u'''_k$ to the input terminal 5B as the equilibrium $u_k$ from the output terminal 5D and outputs the switch control signals C2 and C3 from the output terminals 5E and 5F.

The output terminals 4D and 5D of the comparators 4 and 5 are connected and supply the equilibrium $u_k$ to the input terminal of the driver 6, the input terminal of the equilibrium memory 2, and one contact terminal of a switch S3 which is controlled by the control signal C3.

As described above, the driver 6 outputs a drive current d for driving the step motor 10 in accordance with the input equilibrium $u_k$.

The other contact terminal of the switch S3 is connected to the input terminal of a position error inverse calculator 9. When the switches S3 and S4 are closed, the position error inverse calculator 9 receives the equilibrium $u_k$ output from the comparator 4 or 5 and computes back a position error predicted value $e'_k$ in an inverse order to calculation of the equilibrium $u''_k$ from the position error $e_k$. The position error inverse calculator 9 supplies the position error predicted value $e'_k$ to the equilibrium calculator 1 so that the equilibrium calculator 1 recalculates the equilibrium $u''_k$ using the position error predicted value $e'_k$.

An operation of the circuit shown in FIG. 1 will be described below.

Assume that the head 7 is positioned in accordance with an equilibrium $u_{k-1}$ at the immediately preceding sampling time and therefore the next sampling time is k.

Before the next sampling time k comes, the equilibrium predictor 3 calculates a predicted value $u'_k$ of the equilibrium at the next sampling time k on the basis of actual equilibrium values $u_{k-1}$, $u_{k-2}$, and so on before sampling time $k-1$. In order to calculate the value $u'_k$, an autoregressive model is used. That is, the equilibriums $u_{k-1}$ to $u_{k-N}$ from a prediction point (sampling time) k to Nth previous sampling time are suitably weighted and added to obtain the predicted values $u'_k$ and $u'_{k-1}$. In this case, N is a natural number. The weighting coefficients to be multiplied to the equilibrium values are based on the autoregressive model.

At the next sampling time k, the switch S1 is closed, and the position error detector 8 obtains the position error signal $e_k$ on the basis of the servo information signal a and outputs the signal to the equilibrium calculator 1.

The equilibrium calculator 1 calculates the equilibrium $u''_k$ on the basis of the position error $e_k$ and outputs the signal to the equilibrium predictor 3.

The equilibrium predictor 3 calculates a weighted average value $u'''_k$ from the equilibrium $u''_k$ calculated by the equilibrium calculator 1 and the predicted values $u'_k$ and $u'_{k-1}$ calculated beforehand by itself, and outputs the value from the output terminal 3D.

At this time, the switch S2 is switched to the contact A, and therefore the output $u''_k$ from the equilibrium calculator 1 is supplied to the comparator 4 through the switch S2.

The comparator 4 compares the input $u'_k$ from the equilibrium predictor 3 and the input $u''_k$ from the equilibrium calculator 1 on the basis of equation ().

As a result, if the input $u''_k$ satisfies equation (1), the comparator 4 outputs the input $u''_k$ as the actual equilibrium $u_k$ to the driver 6 so that the driver 6 positions the magnetic head 7. At the same time, the comparator 4 outputs the input $u''_k$ to the equilibrium memory 2 so that the equilibrium memory 2 stores it as the equilibrium $u_k$.

If $u''_k$ does not satisfy equation (1), the comparator 4 outputs the weighted average value $u'''_k$ calculated by the equilibrium predictor 3 to the driver 6 and the equilibrium memory 2 as the equilibrium $u_k$, and then closes the switches S3 and S4 to supply the equilibrium $u_k$ to the position error inverse calculator 9 so that the position error calculator 9 calculates the position error predicted value $e'_k$. The equilibrium calculator 1 recalculates the equilibrium $u''_k$ on the basis of the position error predicted value $e'_k$ and outputs the new equilibrium $u''_k$. Then, the equilibrium calculator 1 switches the switch S2 to the contact B a predetermined number $\delta$ of sampling times, thereby activating the comparator 5.

The comparator 5 compares the output value $u'_k$ from the equilibrium predictor 3 with the output $u''_k$ from the equilibrium calculator 1 the predetermined number $\delta$ of sampling times on the basis of equation (2).

As a result, if the output $u''_k$ satisfies equation (2), the comparator 5 outputs $u''_k$ as the equilibrium $u_k$ to the driver 6 and the equilibrium memory 2.

If $u''_k$ does not satisfy equation (2), the comparator 5 outputs the weighted average value $u'''_k$ calculated by the equilibrium predictor 3 to the driver 6 and the equilibrium memory 2 as the equilibrium $u_k$, and then closes the switches S3 and S4 to supply the equilibrium $u_k$ to the position error calculator 9 so that the position error calculator 9 calculates the position error predicted value $e'_k$. The equilibrium calculator 1 recalculates $e'_k$ as a position error. Then, the number of times for activating the comparator 5 is set to be $\delta$ again.

Figure 2:
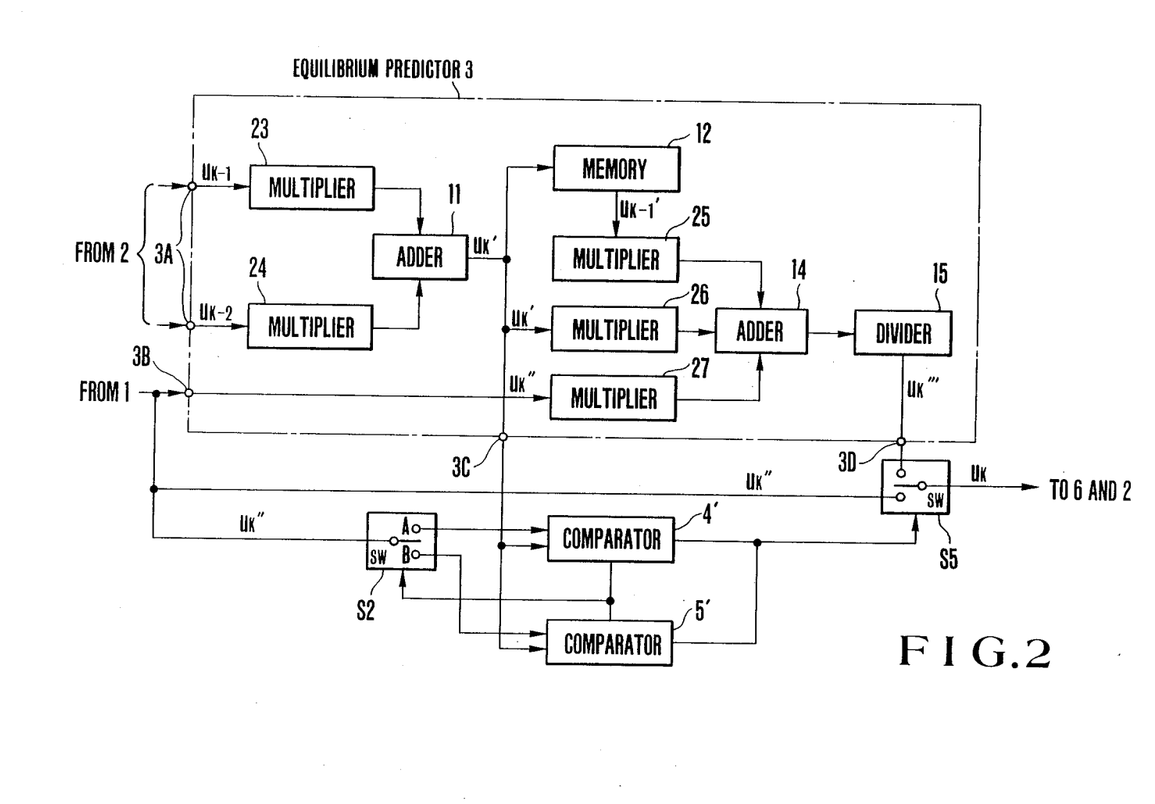
FIG. 2 is a block diagram showing arrangements of an equilibrium predictor 3 and comparators 4 and 5 in the embodiment in FIG 1.

FIG. 2 is a block diagram showing embodiments of the equilibrium predictor 3 and the comparators 4 and 5 of FIG. 1.

In FIG. 2, N=2, i.e., in order to predict the equilibrium $u_k$ at the next sampling time k, the equilibrium $u_{k-1}$ at the current sampling time k and the equilibrium $u_{k-2}$ at the immediately preceding sampling time are used.

In FIG. 2, each of multipliers 23 and 24 fetches the equilibrium $u_{k-1}$ at the current sampling time and the equilibrium $u_{k-2}$ at the immediately preceding sampling time, multiplies the equilibriums with a predetermined constant, and outputs results to an adder 11. An addition result of the adder 11 is the predicted value $u'_k$ of the equilibrium.

The equilibrium predicted value $u'_k$ is supplied to and stored in a memory 12.

Generally, the constants of the multipliers 23 and 24 are different from each other and determined in accordance with the autoregressive model.

At the next sampling time k, the equilibrium $u''_k$ calculated by the equilibrium calculator 1 on the basis of the position error $e_k$ is output.

A multiplier 25 multiplies the predicted value $u'_{k-1}$ of the equilibrium at a sampling time (k−1) stored in the memory 12 with a predetermined constant. A multiplier 26 multiplies the output signal $u'_k$ from the adder 11 with a predetermined constant. A multiplier 27 multiplies the equilibrium $u''_k$ calculated by the equilibrium calculator 1 with a predetermined constant.

Outputs from the multipliers 25, 26, and 27 are added by an adder 14. An addition result of the adder 14 is divided by a predetermined constant by a divider 15, and the weighted average value $u'''_k$ is obtained at the output terminal of the divider 15. The weighted average value $u'''_k$ is output from the output terminal 3D of the equilibrium predictor 3.

The output terminal 3D of the equilibrium predictor 3 is connected to one contact of a switch S5 common for comparators 4' and 5'. The other contact of the switch S5 receives the equilibrium $u''_k$ calculated by the equilibrium calculator 1.

The switch S2 is normally in contact with the contact A at the comparator 4' side. The comparator 4' compares the inputs $u'_k$ and $u''_k$ to check if they satisfy the conditions of equation (1). The comparator 4' switches the switch S5 on the basis of a comparison result, and outputs the equilibrium $u''_k$ calculated by the equilibrium calculator 1 or the weighted average value $u'''_k$ calculated by the equilibrium predictor 3 as the equilibrium $u_k$.

When the comparator 4' outputs the weighted average value $u'''_k$ as the equilibrium $u_k$, the comparator 5' is activated a predetermined number $\delta$ of sampling times because the comparator 4' closes the switch S2 to the contact B side. As a result, the comparator 5' compares the inputs to check if they satisfy the conditions of equation (2) as described above, switches the switch S5 on the basis of a comparison result, and outputs the equilibrium $u''_k$ or the weighted average value $u'''_k$ as the equilibrium $u_k$.

Figure 3:
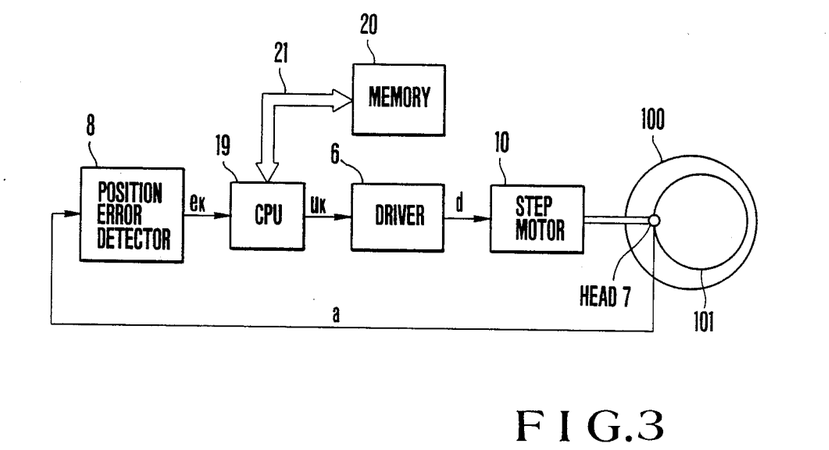
FIG. 3 is a block diagram showing an arrangement of another embodiment of the present invention.

FIG. 3 is a block diagram showing another embodiment of the present invention.

In FIG. 3, the same reference numerals as in FIG. 1 denote the same parts, and a detailed description thereof will be omitted.

In FIG. 3, a CPU 19 calculates an equilibrium or drive control signal, i.e., a stop position of a step motor 10 in accordance with a position error compensation program stored in a memory 20 on the basis of a position error signal $e_k$ supplied from a position error detector 8 and outputs an equilibrium $u_k$ to a driver 6. Reference numeral 21 denotes a data bus.

An operation of the system shown in FIG. 3 will be described.

Figure 4:
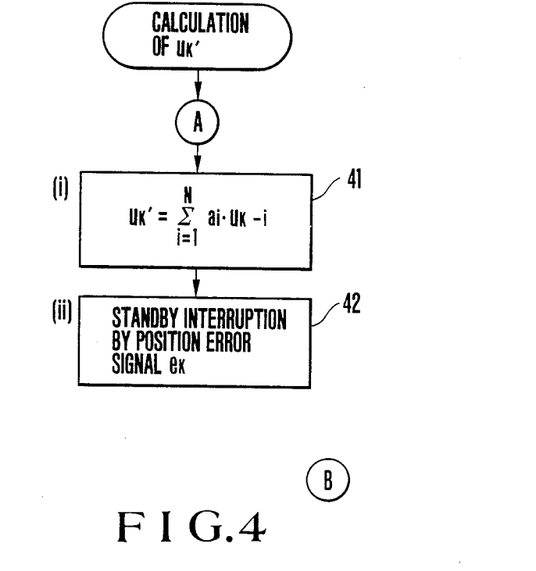
FIG. 4 is a flow chart for explaining an operation of a CPU in the embodiment in FIG. 3.
Figure 5:
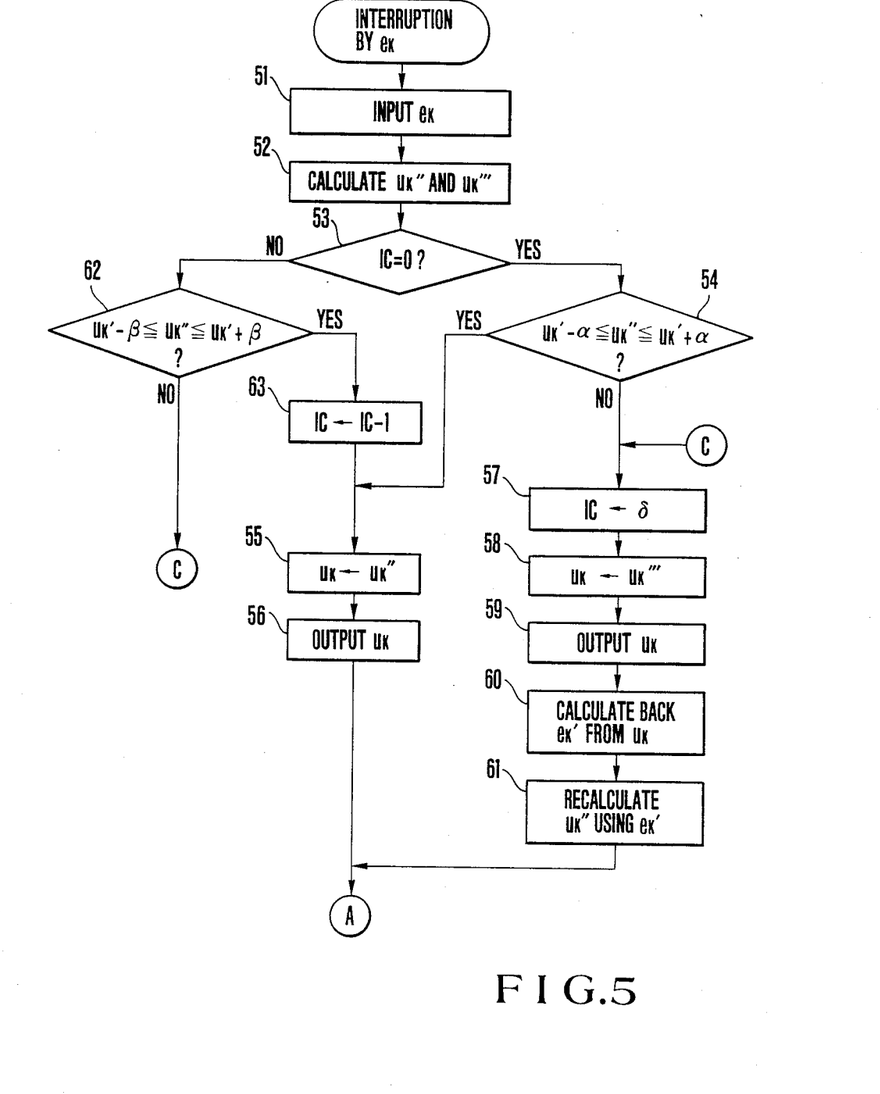
FIG. 5 is a flow chart for explaining an operation of a CPU in the embodiment of FIG. 3.

FIGS. 4 and 5 are flow charts for explaining an operation of the CPU 19.

FIG. 4 is a flow chart for explaining a calculation program of a predicted equilibrium $u'_k$ executed by the CPU 19 before the next sampling time k comes.

In step 41, equilibriums $u_{k-1}$ to $u_{k-N}$ stored in the memory 20 at the current sampling time are multiplied with coefficients $a_1$ to $a_N$, respectively, and added with each other to obtain $u'_k$.

Then, in step 42, the CPU 19 stands by performing other processing until interruption based on the position error signal $e_k$ at the sampling time k is input.

FIG. 5 is a flow chart of a program executed when interruption is set by the position error signal $e_k$.

In FIG. 5, the CPU 19 fetches the position error $e_k$ at the sampling time k (step 51), and calculates the equilibrium $u''_k$ for driving the step motor 10 in accordance with a digital control algorithm (digital compensation filter) as described in U.S. patent application No. 921514 (U.S. Pat. No. 4,788,608) (European Patent Application No. 86114617.3). At the same time, the CPU 19 multiplies $u'_k$, $u''_k$, and $u'_{k-1}$ with constants, adds them, and then divides them by a predetermined constant, thereby calculating the weighted average value $u'''_k$ (step 52).

Then, the value in a counter IC is referred to (step 53). If the value of the IC is 0, the flow advances to step 54. Otherwise, the flow advances to step 62. When a binary autoregressive model is used, for example, a set value of the counter IC can be set as IC=2.

If the value of the IC is 0, $u''_k$ and $u'_k$ are compared with each other in accordance with equation (1) in step 54. In this case, $\alpha$ is a predetermined constant. In order to set $\alpha$, for example, a variance of a predicted error according to an FPE method of Akaike or the like may be used.

If $u''_K$ satisfies the conditions of equation (1), $u''_k$ is stored as the equilibrium $u_k$ in step 55. In step 56, $u_k$ is output to the driver 6, and the flow returns to the routine shown in FIG. 4.

If $u''_k$ does not satisfy the conditions of equation (1) in step 54, the value of the IC is initialized to the value $\delta$ (step 57). Then, the weighted average value $u'''_k$ calculated in step 52 is stored as the equilibrium $u_k$ (step 58) and output to the driver 6 (step 59), and the position error $e'_k$ is calculated back on the basis of the equilibrium $u_k$ (step 60). An algorithm of inverse calculation follows an inverse order of the algorithm of calculating $u''_k$.

Then, in step 61, the equilibrium $u''_k$ is recalculated on the basis of the position error $e'_k$ calculated by inverse calculation, thereby updating $u''_k$.

Thereafter, the flow returns to the routine shown in FIG. 4.

If the value of the IC is other than 0 in step 53, the flow advances to step 62, and $u''_k$ and $u'_k$ are compared with each other in accordance with equation (2).

If $u''_k$ satisfies the conditions of equation (2), the flow advances to step 63 to decrement the value of the IC by one, and processing in steps 55 and 56 is performed.

If $u''_k$ does not satisfy the conditions of equation (2), the flow advances to step 57 and then returns to the routine shown in FIG. 4 through steps 58 to 61.

Thereafter, processing is similarly repeated to compensate for the position error and perform control positioning of the magnetic head 7.

As has been described above, according to the present invention, the position error signal is compensated for by detecting abnormality of an equilibrium.

In general, in the FDD apparatus, an eccentricity of a data track has a frequency component dominant over a disk rotational frequency and a frequency twice the disk rotational frequency. For this reason, an equilibrium of the magnetic head has a frequency component dominant over the same frequencies. Therefore, the equilibrium can be predicted with high accuracy using the autoregressive model as a spectrum analyzing method.

Therefore, an abnormality of the equilibrium is detected by predicting the equilibrium using the autoregressive model based on the spectrum analysis. When an abnormality is detected, a position error signal is calculating by calculating back an algorithm for calculating the equilibrium on the basis of the predicted value of the equilibrium to compensate for the position error, thereby changing the value calculated by the equilibrium calculator 1. As a result, degradation in tracking characteristics of the magnetic head 7 with respect to the data track caused by noise or medium defects can be prevented, and therefore the magnetic head 7 can be positioned at a target data track with high accuracy.

The present invention is not limited to the FDD apparatus. For example, the present invention can be applied to a head positioning control apparatus which performs calculation in a hardware or software manner on the basis of a discretely-sampled position error signal to obtain an equilibrium.

What is claimed is:

1. A head positioning system for compensating for position error, comprising:
    a head for reading servo information recorded on a recording medium, and for outputting the readout information as a servo information signal;
    position error detecting means for detecting a first position error signal $e_k$ between a target position to be followed by said head and a current position of said head;
    a drive mechanism, coupled to receive a head drive control signal $u_k$, for driving said head so as to follow the target position;
    calculating means, coupled to receive an output of said position error detecting means, for calculating, at a present sampling time, a potential drive control signal $u_k''$ in accordance with the detected first position error;
    memory means for string the head drive control signal for said drive mechanism at each sampling time;
    predicting means for generating a predicted drive control signal $u_k'$ in accordance with previous head drive control signals stored in said memory means, and for generating a weighted average drive control signal $u_k'''$; and
    first output means for comparing said calculated potential drive control signal with a first range defined in accordance with said generated predicted drive control signal and a first predetermined value, and for outputting, as said head drive control signal for said drive mechanism, said generated weighted average drive control signal or said calculated potential drive control signal in accordance with said comparison.

2. The system ad defined in claim 1, further comprising:
    position error inverse calculating means for calculating a second position error signal $e_k'$ in accordance with the head drive control signal outputted by said first output means; and
    second output means, operable when the weighted average drive control signal is outputted from said first output means, for causing said calculating means to calculate the potential drive control signal in accordance with the second position error signal instead of said detected first position error signal, for comparing for a predetermined number of sampling times, the potential drive control signal calculated in accordance with the second position error with a second range defined by the generated predicted drive control signal and a second predetermined value, and for outputting, as the head drive control signal, the generated weighted average drive control signal or the potential drive control signal calculated in accordance with the second position error depending on the comparison result of said second output means.

3. The system as defined in claim 2, wherein said predicting means comprises:
    a plurality of first multiplier means for multiplying previous head drive control signals stored in said memory means with predetermined constants, respectively, first adder means for adding outputs from said plurality of first multiplying means, thereby obtaining said predicted drive control signal; predicted value memory means for storing an output from said first adder means; and means for calculating said weighted average drive control signal in accordance with an output from said first adder means, the predicted drive control signal stored in said predicted value memory means during a previous sampling time; and the calculated potential drive control signal.

4. The system as defined in claim 3, wherein said first output means comprises:

first comparator means for comparing the calculated potential drive control signal with the first range; a first switch operable, when the potential drive control signal is not within the first range, for supplying, as the head drive control signal, the calculated weighted average drive control signal to said drive mechanism; and a second switch operable, when said first switch supplies the weighted average drive control signal, for causing the output of said first output means to be supplied to said position error inverse calculating means for a predetermined number of sampling times.

5. The system as defined in claim 3, wherein said second output means comprises:

a second comparator for comparing the head drive control signal outputted from said first output means with the second range and being operable, when the head drive control signal outputted by said first output means is not within the second range, for supplying the calculated weighted average drive control signal, as said head drive control signal, to said drive mechanism.

6. The system as defined in claim 3, wherein said weighted average drive control signal calculating means comprises:

a plurality of second multiplying means for multiplying the output of said first adder means, the predicted drive control signal stored in said predicted value memory means, and the potential drive control signal with predetermined constants;
second adder means for adding the outputs from said second multiplier means; and
divider means for dividing an output of said second adder means by a predetermined value.

7. The system as defined in claim 1, wherein said drive mechanism comprises a driver for receiving the head drive control signal, and for outputting a drive current signal in accordance with the received head drive control signal, and a stepper motor, connected to receive the drive current signal from said driver, for controlling said head in accordance with the received drive current signal.

* * * * *

UNITED STATES PATENT AND TRADEMARK OFFICE
CERTIFICATE OF CORRECTION

PATENT NO. : 4,982,297
DATED : January 1, 1991
INVENTOR(S) : Takahiko TSUJISAWA

It is certified that error appears in the above-identified patent and that said Letters Patent is hereby corrected as shown below:

Column 4, line 2, delete "u"hd k" and insert --$u''_k$--; and line 66, delete "()", and insert --(1)--.

Column 8, line 25, delete "string", and insert --storing--; and line 41, delete "ad", and insert --as--.

Signed and Sealed this

Eighth Day of December, 1992

Attest:

DOUGLAS B. COMER

*Attesting Officer*   Acting Commissioner of Patents and Trademarks